Nov. 19, 1935.   J. T. GANTT   2,021,547
PLOW
Filed Oct. 30, 1934
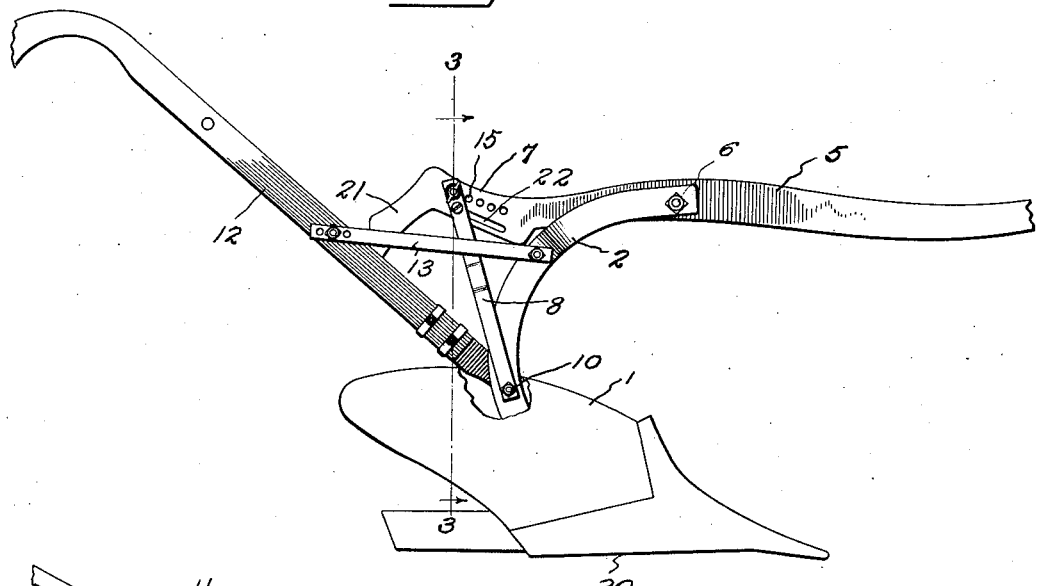
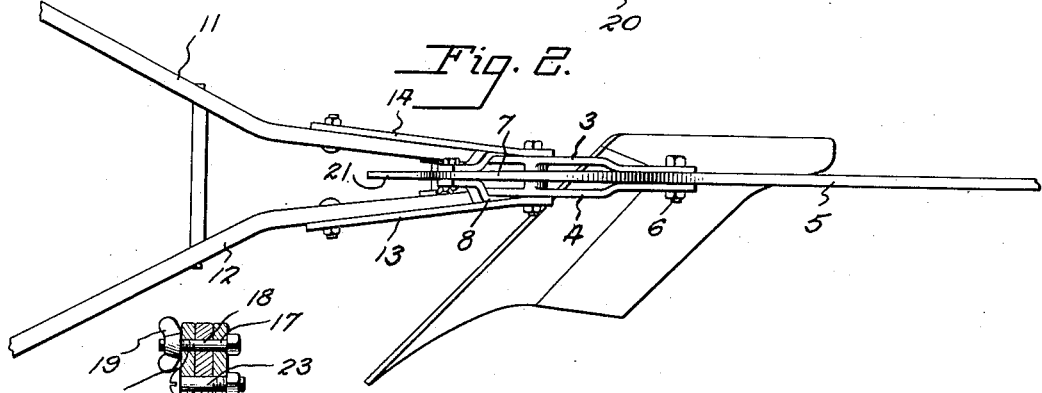
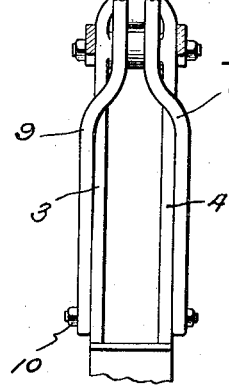
Inventor
J. T. Gantt
By Mason Fenwick & Lawrence
Attorneys Patented Nov. 19, 1935

2,021,547

UNITED STATES PATENT OFFICE 2,021,547

PLOW

James T. Gantt, Macon, Ga.

Application October 30, 1934, Serial No. 750,727

4 Claims. (Cl. 97—195)

This invention relates to plows. It has for one of its objects the provision of a plow adjustment by means of which the angle between the beam and plow body may be changed for deeper or shallower plowing, and by which the plow after reaching the depth to which it is set, levels off automatically so that its bottom is always parallel to the base of the furrow, thus causing it to maintain the plowing depth to which it is set.

Another object of the invention is to provide means adjustable synchronously with the changes in elevation of the pull bar for thrusting against the plow from the rear of its center of gravity for holding it to the ground, thus relieving the necessity for pressing upon the handles.

A further object of the invention is the provision of a pivoted pull bar, with means located at the rear of the point of pivotal suspension for making height adjustment of the pull bar, and accessible to a man standing between the handles.

Still another object of the invention is to provide a pin and hole adjustment between the rear end of the pull bar and a connection from the plow, including an arcuate guide running parallel to a series of adjusting holes, and a bolt through said guide and connecter by means of which the connecter is guided so as to keep the adjusting pin in the path of said holes, thus assuring the alignment of said pin with any of the holes in said pull bar in making the required adjustment.

Other objects of the invention will appear as the following description of a preferred and practical embodiment thereof proceeds.

In the drawing which accompanies and forms a part of the following specification and throughout the several figures of which the same characters of reference have been employed to designate identical parts:

Figure 1 is a side elevation of a plow embodying the features of the present invention;

Figure 2 is a plan view; and

Figure 3 is a section taken along the line 3—3 of Figure 1.

Referring now in detail to the several figures, the numeral 1 represents the plow body to which is rigidly secured the shank 2 which in the preferred form of the invention is composed of two similarly suitably curved plates 3 and 4, embracing between them adjacent their upper ends the pull bar 5 pivotally secured by a bolt 6 passing through said plates near their ends. The outer end of said pull bar is designed of course to be hitched to team or tractor while the inner end 7 which extends rearwardly of the pivotal connection to a point adjacent the handles is adjustably secured to and between a pair of bars 8 and 9 which form a link, preferably embracing the shank 2 at its lower end, being pivotally connected to said shank by the bolt 10. A pair of handles 11 and 12 of customary construction are rigidly secured to the plow both adjacent the body and by means of straps 13 and 14 extending from handles to the shank 2.

The adjustable connection between the pull bar and the bars 8 and 9 is constituted by a series of holes 15 in the pull bar and holes 16 and 17 in the adjacent ends of the bars 8 and 9, said latter holes receiving a pin 18 which is adapted to be passed through any one of the holes 15 and to be secured by means such as the wing nut 19. The bars 8 and 9 when the pin 18 is withdrawn, swing around the pivotal connection afforded by the bolt 10, their outer ends of course travelling in a circumferential arc. The series of holes is arranged in a line, either straight or arcuate which intersects the circumferential path of the outer ends of the bars 8 and 9. Consequently, each hole when the bolt is in position of adjustment, represents a different position of elevation of the pull bar 5. The length of the bars 8 and 9 is so related to the pull bar that in any position of elevation of the pull bar, the plow after nosing up or down as the case may be, until it reaches the desired level disposes itself so that the bottom face 20 remains parallel to the base of the furrow at the desired depth.

It is, of course, well known that for changing the depth of the furrow, it is customary to elevate or depress the pull bar. When the pull bar is elevated, the team or tractor drags down on its outer end and the point of the plow seeks to embed itself deeper in the soil. In the absence of some synchronous adjustment of the plow body, the point will continue to dive until the handles are pulled out of the grasp of the plowman and the plow upsets. If the forward end of the pull bar is depressed through the adjustment made between the pin 18 and one of the holes 15, for shallow plowing the team or tractor draws it upwardly which tends to elevate the point of the plow and pull it out of the soil. This will happen in the absence of means for adjusting the position of the plow body to correspond to the elevation of the pull bar. Such means is provided in the present invention in the bars 8 and 9 and the manner in which they are connected to the pull bar. When it is desired to raise the pull bar, the bars 8 and 9 are connected to the rearmost hole as illustrated in Figure 1. This causes the plow bottom to run parallel to the furrow in the adjusted position of the pull bar. If it be desired to have the plow work at a shallower depth, the pin 18 is removed and the holes in the bars 8 and 9 brought into registry with one of the forward holes in the pull bar. This simultaneously depresses the forward end of the pull bar and swings the plow body to a new position in which its bottom surface still runs parallel to the furrow.

The rear end of the pull bar preferably terminates in a grip 21 which can be comfortably reached and grasped by a person standing between the handles, from which point the adjustment in the elevation of the pull bar can be conveniently made. To facilitate the aligning of the holes in the bars 8 and 9 with any of the holes 15 in the pull bar, the outer ends of the bars 8 and 9 are guided in a definite path by means of a slot 22 in the pull bar which parallels the direction of the series of holes 16, and in which slot a bolt 23 plays, which bolt passes through suitable apertures in the bars 8 and 9. By virtue of this bolt and slot connection, the pin 18 always travels in the path of the series of holes 15, so that it is only necessary for the plowman making the adjustment to grasp the pull bar by the grip 21 and hold the pin 18 in one of the holes 16 or 17 in the bars 8 and 9 with the end of the bolt pressing lightly against the side of the pull bar, whereupon, when the proper position of elevation has been determined, the bolt can be slipped through the hole 15 with which it automatically comes into registry. It is never necessary to take out the bolt 23 and in fact the bolt 23 can always be kept only so tight as to afford a free sliding connection between the parts.

It will be understood that due to the position of the pivotal connection between the rear end of the pull bar and the bars 8 and 9 with respect to the pivotal connection 6, an upwardly directed force upon the outer end of the pull bar will create a downward thrust in the opposite direction through the bars 8 and 9 against the plow bottom, in the region of the center of mass of the plow body, that is to say, in the direction toward the center of the plow bottom, and the adjustment of the link in the various holes 15 shifts the line of thrust forward or backward with respect to the center of the plow bottom.

It will be understood from the above description that while I have disclosed what I believe to be a preferred and practical embodiment of the invention, the details of construction as illustrated and described are merely by way of example and not to be construed as limiting the scope of the invention as claimed.

What I claim is:

1. Plow comprising a body, a pull bar pivotally mounted at a point forward of the center of mass of said body, and a link pivotally connected to said body at such a point as to be directed approximately toward the center of the plow bottom and adjustably connected to said pull bar rearwardly of its pivotal axis for changing the angular relation of the plow body to said pull bar when the connection between said pull bar and link is varied, said adjustable connection comprising a pin mounted in the upper end of said link selectively engageable with any of a series of holes formed in said pull bar, said series being disposed in a line which intersects the circumferential path of swing of the upper end of said link.

2. Plow as claimed in claim 1, including means for maintaining said pin in the path of said series of holes when said link is detached from said pull bar for purpose of adjustment, said means comprising a slot extending parallel to said series of holes and a bolt carried by said link and playing in said slot.

3. Plow comprising a body, a pull bar pivotally mounted at an intermediate point with respect to said body, and a link pivotally connected to said body and adjustably connected to said pull bar rearwardly of its pivotal axis for changing the angular relation of the plow body to said pull bar when the connection between said pull bar and link is varied, said adjustable connection comprising a pin mounted in the upper end of said link selectively engageable with any of a series of holes formed in said pull bar, said series being disposed in a line which intersects the circumferential path of swing of the upper end of said link, and means for maintaining said pin in the path of said series of holes when said link is detached from said pull bar for purpose of adjustment, said means comprising a slot extending parallel to said series of holes and a bolt carried by said link and playing in said slot, said pull bar being formed with a grip rearwardly of said adjustable connection and accessible to an operator standing at the rear of said plow.

4. Plow comprising a body, a pull bar pivotally mounted at an intermediate point with respect to said body and a link adjustably connected to the inner end of said pull bar and connected to said body at such point as to transmit a component of the draft force approximately in the direction of the center of the plow bottom, the means for adjustably connecting said link and pull bar simultaneously shifting the line of force transmission slightly rearwardly of the center of the plow bottom as the pull bar is lowered, and shifting it slightly forwardly with respect to the center of the plow bottom when the pull bar is raised.

JAMES T. GANTT.